June 1, 1965 G. W. JORDAN, JR 3,187,249

FREQUENCY DIVIDER CIRCUIT

Filed Dec. 5, 1960

2 Sheets-Sheet 1

INVENTOR
G. W. JORDAN, JR.
BY
Walter M. Hill
ATTORNEY

June 1, 1965 G. W. JORDAN, JR 3,187,249
FREQUENCY DIVIDER CIRCUIT
Filed Dec. 5, 1960 2 Sheets-Sheet 2

INVENTOR
G. W. JORDAN, JR.
BY
Walter M. Hill
ATTORNEY

United States Patent Office 3,187,249

Patented June 1, 1965

3,187,249

FREQUENCY DIVIDER CIRCUIT

George W. Jordan, Jr., Parsippany, N.J., assignor to Bell Telephone Laboratories, Incorporated, New York, N.Y., a corporation of New York Filed Dec. 5, 1960, Ser. No. 73,946
2 Claims. (Cl. 321—68)

This invention relates to the art of frequency division and more particularly to a circuit arrangement therefor.

In the prior art, frequency dividers have frequently taken on the form of circuits involving resistors, capacitors, transistors, diodes, magnetic cores and similar circuit components embodied in relatively complicated circuit structures. Almost invariably all of these circuits have required a separate power source for their operation. As the division of increasingly higher frequencies became necessary, the circuits became more complicated. The addition of circuit components to such circuits tends to place limitations upon the frequency at which division may take place, the reason being largely because of stray impedances or admittances introduced by these additional components. Moreover, in circuits for such systems as computers which very often involve a large number of frequency dividers, these additional components rapidly increase the cost of the system. As additional components are added, the overall reliability tends to lower. It is, therefore, of particular advantage, both from an economic standpoint and from the standpoint of reliability, that the number of components in the divider circuit be reduced as much as possible. This is especially true at the present time where electronic systems are becoming more and more complex so that the simplification and reduction of the number of components is a most desirable objective to achieve.

It is an object of this invention to divide the frequency of a voltage source with a minimum number of circuit components, thereby both increasing the circuit reliability as well as decreasing the construction cost.

The foregoing object is achieved by the frequency divider of this invention which comprises simply a resistor and an inductor connected in series with a diode havign inherent hole storage properties. Sharp pulses at subharmonic frequencies of an applied alternating voltage appear across the diode, the subharmonic developed depending primarily on the magnitude of the driving voltage and the amount of hole storage in the diode. By increasing this voltage beyond a critical limit, a division by two may be made to change to a division by three with sufficient voltage latitude in each range to insure dividing stability.

This invention may be better understood by reference to the accompanying drawings, in which:

FIG. 1 discloses an embodiment of the invention wherein the inductor inherently contains sufficient internal resistance to meet the resistance requirements of the circuit;

FIG. 2 discloses an embodiment of the invention in which the inductor is assumed to be substantially resistance free and the required circuit resistance is externally added in series, this figure also suggesting the addition of a small capacitor in shunt with the diode to augment the hole storage effect;

Figure 1:
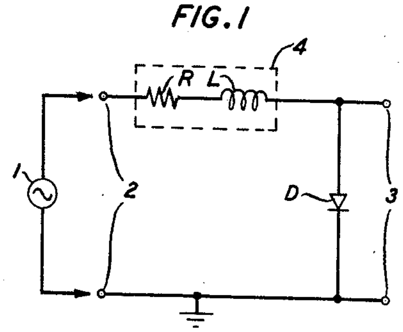

Referring now to FIG. 1, a source of alternating voltage 1 is required to be divided in frequency and made available at output terminals 3. This source of voltage is applied to input terminals 2 which are connected in series with an inductor 4 containing inductance L and resistance R. Also in series with this inductor is a diode D having a substantial amount of inherent hole storage. As will be shown later, if the voltage of source 1 of sufficient magnitude is impressed on terminals 2 a subharmonic of the frequency of source 1 will be made to appear at output terminals 3. It has been found experimentally that this voltage of source 1 may vary throughout a substantial range without altering the order of frequency division so that this circuit has been found to be reliably stable with respect to source voltage variations. As will also be shown later, it is a requirement of such circuits that they contain a suitable amount of series resistance, such as resistance R, either inherently as a part of inductor 4 or externally supplied by some means. In the event that the inductor 4 contains sufficient internal resistance as assumed in FIG. 1, the frequency divider circuit itself is reduced to the extreme simplicity of only two physical components, namely, the inductor 4 and the diode D.

Figure 2:
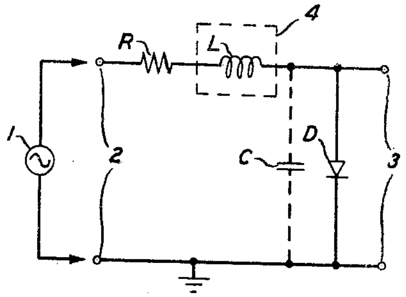

FIG. 2 discloses a circuit essentially identical with FIG. 1 except that it is assumed that the inductor 4 is substantially free of an appreciable amount of resistance so that it is externally supplied by the resistance R as shown. This resistance may be supplied by a series-connected resistor and may be comprised, at least in part, by resistance in the diode. This figure also shows a capacitor C which may be connected in shunt with diode D to augment the hole storage effect. This capacitor has been found to be helpful at lower frequencies, particularly where the circuit is working into an appreciable load, which would otherwise require diodes with extremely large hole storage. If a diode of sufficient hole storage is not available for a particular low frequency range desired, the lowest frequency which can be divided can be extended somewhat by the addition of this small capacitance. It is, of course, obvious that there must be a limit as to the size of this capacitor because, as a circuit element, it does not have the identical properties of hole storage. As this capacitance is increased, it tends to become an increasingly effective alternating current short circuit across the diode. Regardless of the theory which may be advanced with respect to the effect of such a capacitor, it has been experimentally demonstrated that such a capacitor can extend to lower frequencies the operable range of frequency division of a given diode.

Figure 3:
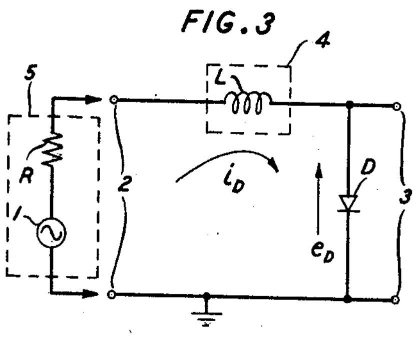
FIG. 3 is similar to FIG. 2 except that the necessary resistance is assumed to be included in the voltage source.

In FIG. 3 the inductor 4 is again assumed to be substantially free of internal resistance but the source 5 is assumed to comprise an alternating source of electromotive force 1 with sufficient internal resistance R to satisfy the circuit requirements for proper frequency division. It will be evident that the circuits of FIGS. 1, 2 and 3 are all essentially identical and therefore operate in an identical manner. It should also be noted that in no case is it necessary to provide an additional power source to operate the frequency divider so that each of these circuits is representative of extreme simplicity.

Figure 4:
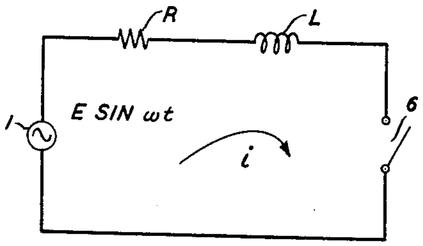
FIG. 4 is an elementary circuit presented for the purpose of illustrating some of the fundamental principles of the invention.
Figure 5:
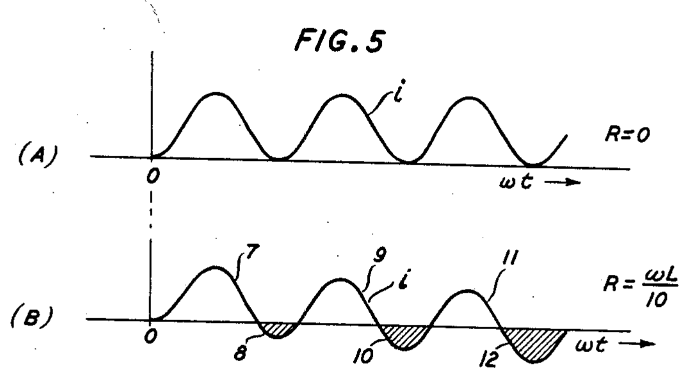
FIG. 5 is illustrative of current waves developed by the circuit of FIG. 4 under two conditions of operation.

Before explaining further the operation of the invention, reference may be made to FIGS. 4 and 5. The basic circuit properties of an inductor in series with a resistance when suddenly connected to a source of alternating current have been thoroughly explored and have been known for many years. Reference for such prior knowledge may be made to the "Radio Engineering Handbook," by Keith Henney, 1950 edition, page 190, and also to pages 53 to 57 of "Alternating Currents," by Bedell and Crehore, 1895 edition. The mathematical expressions in these publications may be as given below for the condition where switch 6 of FIG. 4 is closed at the instant that the voltage of source 1 is passing through zero in the positive direction.

$$i=\frac{E}{Z}\left[\epsilon^{-\frac{Rt}{L}}\sin\phi+\sin(\omega t-\phi)\right] \qquad (1)$$

where:

$i$=the instantaneous current.
$E$=the maximum value of the voltage source 1.
$Z$=impedance of R and L at frequency $\omega$.
$\epsilon$=base of natural logarithms.
$t$=time
$\phi=\tan^{-1}\omega L/R$ Consider first the case where the resistance is zero. The above expression then reduces to $$i=\frac{E}{Z}[1-\cos\omega t] \qquad (2)$$

It will be seen that expression (2) represents a current varying between zero and twice the maximum current amplitude as indicated in FIG. 5(A).

The effect of introducing resistance is shown in FIG. 5(B). This curve was plotted for the condition where $R=\omega L/10$. It will be noted that the minimum values of the current wave are progressively more negative. Actually, this curve represents a sine function superimposed on an exponential function. For the conditions assumed, the angle $\phi$ of Equation 1 sufficiently approximates 90 degrees that the current for FIG. 5(B) may be expressed as follows:

$$i\doteq\frac{E}{10R}\left[\epsilon^{-\frac{\omega t}{10}}-\cos\omega t\right] \qquad (3)$$

Figure 6:
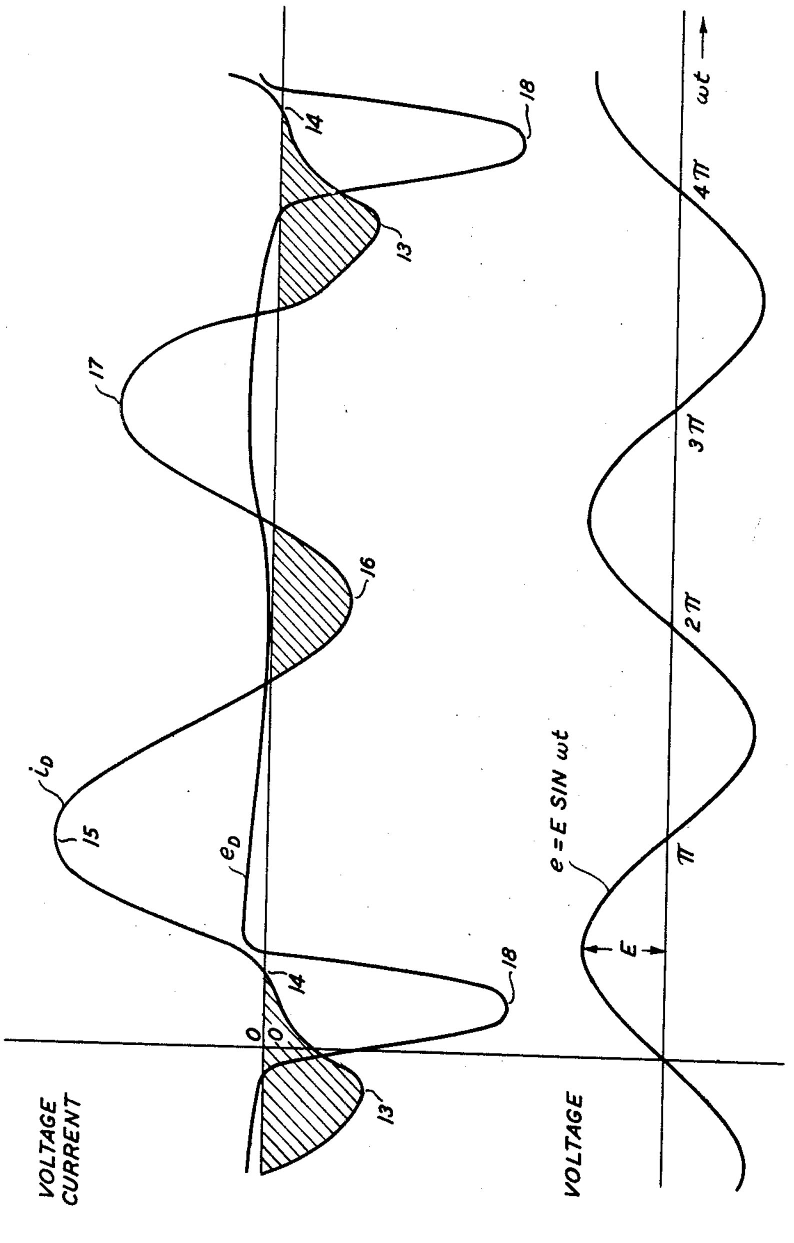
FIG. 6 is illustrative of the voltage and current waveforms developed by the circuits of FIGS. 1, 2 and 3.

It may now be stated that the action of diode D approximates that of switch 6 in that it automatically tends to become conductive at the instant the current passes through zero in its positive directions. With specific reference to FIGS. 3 and 6, let it be assumed that the voltage of source 1 may be represented by the sine wave in the lower part of FIG. 6 having a maximum amplitude of E. Let it be assumed also that the positive direction of current flow through the diode is as shown by the curved current arrow $i_D$ shown in FIG. 3 and that the positive direction of voltage across the diode is as shown by the voltage arrow $e_D$. With these conventions, the characteristic curves in the upper portion of FIG. 6 are shown in their proper phase relationships with respect to the impressed voltage represented by the sine wave in the lower portion of FIG. 6. These curves were obtained from oscillograms and then drawn to sufficient scale to show the significant voltage and current characteristics of the diode. Disregarding for the moment the change in curvature between points 13 and 14 of the current curve $i_D$ it will be noted that this current curve is quite similar to that shown in FIG. 5(B). The first positive half cycle of current is illustrated by portion 15 in FIG. 6. This represents the largest positive peak after the diode becomes conductive just as portion 7 in FIG. 5(B) represented the most positive excursion of current after switch 6 was closed. Following this, the current becomes negative at 16, again returns to a positive value at 17 less than that which it reached at point 15 and again swings to a negative value at point 13 which is more negative than the first negative excursion at point 16. It will be noted that this same action occurred in FIG. 5(B) where the positive excursions 9 and 11 were successively less positive than the positive excursion 7 and the negative excursions 10 and 12 were progressively more negative than the negative excursion 8. This demonstrates the necessity for using resistance in the circuit for, as will become apparent later, this progressively increasing negative excursion of current is necessary to permit the circuit to accomplish frequency division.

Now consider the current wave reducing from the positive portion 17 in FIG. 6 toward its negative point 13. The shaded portion in this curve, as well as the shaded portion at point 16, represents a reversal of current through the diode while the diode is actually still conductive due to hole storage. In order to accomplish frequency division, it is essential that the diode have this hole storage characteristic so that during the negative excursion at point 16 the diode remains continuously conductive. The diode would carry no negative current if it had no hole storage. At point 13 in FIG. 6 this current became of sufficient magnitude in the negative direction to substantially sweep all of the holes out of the diode, thus causing the diode to begin to open circuit and increase rapidly in resistance. This rapid increase in diode resistance causes the change is curvature between points 13 and 14 of the current wave. As the current characteristic approaches point 14 the holes have been substantially swept out of the diode so that the diode becomes essentially an open circuit. At point 14 the current reverses in polarity and the diode becomes conductive again, thus restarting the frequency division cycle.

While the current wave $i_D$ of FIG. 6 is passing beyond point 13 at the point where the diode is beginning to open circuit, the rate of change of current with time rapidly increases and in the opposite direction thereby causing the induced voltage in inductor L to reverse and increase rapidly in magnitude. This voltage appears across the diode terminals, it being remembered that the diode resistance is now rapidly becoming high. This voltage peak is represented by the portion 18 of the diode voltage characteristic $e_D$ in FIG. 6. It will be noted that such a pulse occurs once for every two cycles of the impressed voltage wave, thus dividing the frequency by 2.

By increasing the magnitude of the driving voltage, sufficient hole storage can be produced in the diode during the first positive current excursion to require three cycles of impressed voltage before a sufficient negative current is reached to cause the diode to open, thus effecting a division by a factor of three. It will be appreciated that where the driving frequency is made lower, larger inductors should be used to reduce the required input voltage. Conversely, as the driving frequency is increased, this inductor may be made smaller. To change the frequency division from a factor of 2 to a factor of 3, the voltage must be considerably increased and it has been experimentally determined that for some circuits this increase is in the order of 16 decibels. It is therefore evident that the circuit is exceedingly stable against ordinary source voltage variations.

While this invention has been described with reference to a sine wave driving voltage, it has been experimentally determined that other waveforms are also readily divided. Sharp square waves as well as highly distorted waveforms may be divided. The principal requirement is that the first forward conductive cycle be of sufficient magnitude to produce enough hole storage to keep the diode conductive throughout at least one of the succeeding reverse current flows. This frequency divider circuit has been found exceedingly reliable, highly stable, particularly against source voltage variations, and is obviously the ultimate in simplicity. As has been previously pointed out, this circuit has the additional advantage of requiring no power supply source. It is evident that the diode junction of any other solid state devices, such as a transistor, having sufficient hole storage, may be used in place of diode D or may be connected as a diode and so used.

What is claimed is:

1. A frequency divider comprising a pair of input terminals, an impedance means effectively consisting solely of substantially pure resistance, an inductor and a diode connected in series between said pair of input terminals, said diode having hole storage properties, and a pair of output terminals for connecting an output circuit directly across said diode.

2. The combination of claim 1 and a capacitor connected in parallel with the diode to increase its hole storage effect.

References Cited by the Examiner

UNITED STATES PATENTS

| | | | |
|---|---|---|---|
| 2,829,282 | 4/58 | Hughes et al. | 307—107 |
| 2,944,205 | 7/60 | Keizer et al. | 321—69 |
| 3,037,143 | 5/62 | Marley | 307—106 |
| 3,056,046 | 9/62 | Morgan | 307—106 |

LLOYD McCOLLUM, *Primary Examiner.*

SAMUEL BERNSTEIN, ROBERT C. SIMS, RALPH D. BLAKESLEE, *Examiners.*